United States Patent [19]

Haber

[11] Patent Number: 4,496,500
[45] Date of Patent: Jan. 29, 1985

[54] METHOD FOR VEHICLE BODY SHAPING

[76] Inventor: Alexander Haber, 2296 Rockwood Ave., Baldwin, N.Y. 11510

[21] Appl. No.: 479,479

[22] Filed: Mar. 28, 1983

[51] Int. Cl.³ ............................................. B29C 23/00
[52] U.S. Cl. .................................. 264/36; 29/402.18; 156/94; 264/162; 409/293; 409/308; 425/458
[58] Field of Search ................. 264/36, 162; 425/458; 409/293, 308; 29/402.18, 402.06; 83/13; 15/236 R, 245; D8/45

[56] References Cited

U.S. PATENT DOCUMENTS

| | | | |
|---|---|---|---|
| 3,229,361 | 1/1966 | Valacich | 29/402.18 |
| 3,341,878 | 9/1967 | Hubbard | 15/235.4 |
| 4,047,504 | 9/1977 | Borba et al. | 15/236 R |
| 4,147,576 | 4/1979 | Beem et al. | 156/94 |
| 4,148,122 | 4/1979 | Phillips et al. | 156/94 |
| 4,430,133 | 2/1984 | Griffith | 264/36 |

OTHER PUBLICATIONS

Montgomery Ward, 1968 Fall and Winter Catalog, p. 765.

Primary Examiner—Jay H. Woo
Assistant Examiner—James C. Housel

[57] ABSTRACT

A method for shaping a motor vehicle panel is provided. Body filler material is applied to a damaged area of a panel and allowed to harden partially. Using back and forth strokes, a saw-toothed blade is used to shape the material to the desired contour. The blade should be flexible to allow the user to bend it to the shape of the panel. Curved panels can accordingly be shaped as easily as flat panels.

4 Claims, 7 Drawing Figures

U.S. Patent  Jan. 29, 1985  Sheet 1 of 2  4,496,500
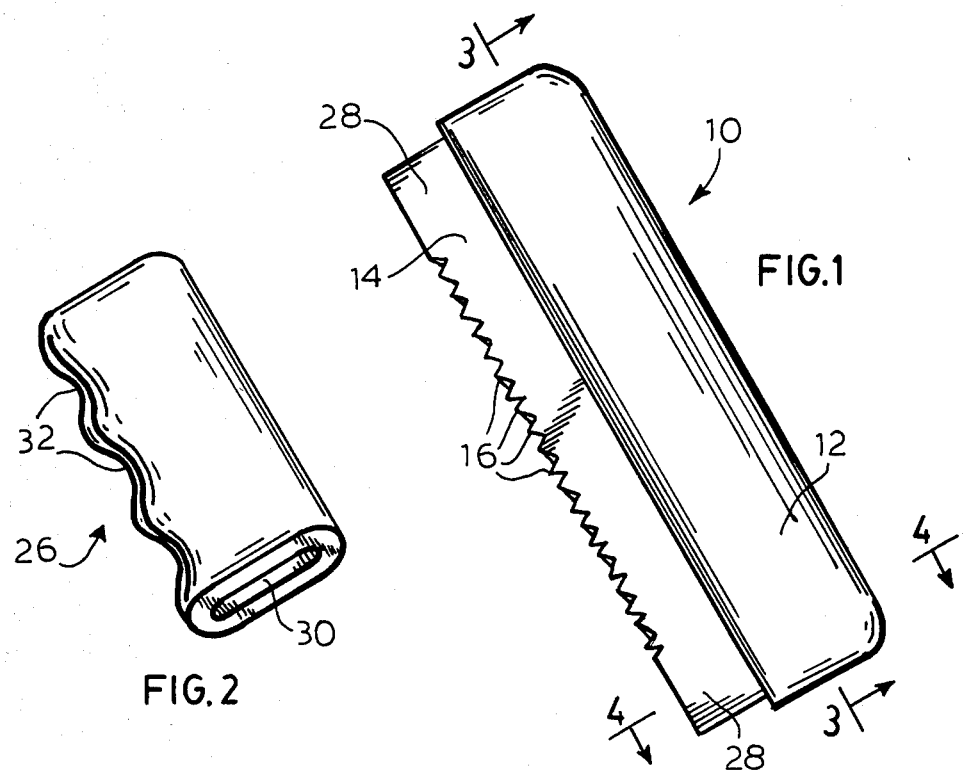
FIG.1
FIG.2
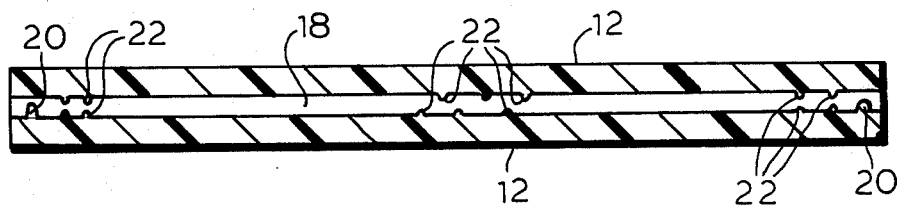
FIG.3
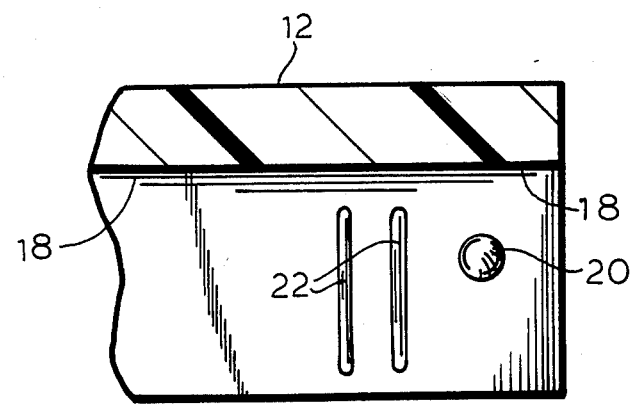
FIG.4

METHOD FOR VEHICLE BODY SHAPING

BACKGROUND OF THE INVENTION

1. Field of the Invention

The field of the invention relates to a method and apparatus for shaping the body of a motor vehicle after putty has been applied to a damaged area.

2. Brief Description of the Prior Art

Repair or reconstruction of a motor vehicle body usually involves shaping certain portions to their original specifications. This must be done with precision as subsequent painting will cause imperfections to be highlighted. Particular care is necessary along body lines where defects are often most visible.

Once the preliminary work of pulling out dents, replacing corroded or damaged panel sections, etc. is completed, putty is applied over the damaged areas. The putty has traditionally been conformed to the shape of the vehicle panel by means of a planing tool. The tool includes a flat blade having a plurality of rows of diagonal cutting edges. By applying firm back and forth strokes with the tool before the putty has hardened, it may be "grated" into the desired shape. Additional applications of putty and further grating may be necessary before the surface is ready for sanding.

One of the difficulties in using the planing tool is that the cutting blade is rather hard and brittle. It is easily damaged upon incidental contact with metal surfaces and must be replaced fairly often. This is both time consuming and expensive.

Another difficulty arises in contouring curved panels with a straight tool. Even if the cutting blade used has an arcuate configuration, it is still straight and is not easily employed for shaping a damaged area to the exact profile of the curved panel.

The planing tool is also deficient in the shaping of vehicle body lines which may have been damaged. The damaged area must be provided with a line which is in perfect alignment with the undamaged panel portions. It is difficult to see exactly where one is removing material when using the planing tool and such alignment accordingly requires considerable skill and patience.

SUMMARY OF THE INVENTION

A shaping tool and a method of shaping a vehicle body are provided by the invention. One embodiment of the tool comprises an elongate holder having a longitudinal slot therein. An elongate cutter blade is removably positioned within the slot. It may be inserted or withdrawn therefrom easily and manually. The cutter blade includes a saw-toothed edge which projects from the slot.

A second embodiment of the invention comprises a flexible saw-toothed cutting blade having handle grips secured to the opposite ends thereof. The handle grips are preferably removable so that the same blade may also be used within the elongate holder described above. A kit including one or more elongate holders, a pair of handle grips, and a plurality of cutting blades of various lengths enables one to shape virtually every panel of a motor vehicle regardless of whether it is curved or flat.

The methods according to the invention are practical by using the above-described tools. When a relatively flat surface is to be shaped, putty is applied to the damaged area and allowed to harden at least partially. The cutter blade is positioned within the slotted holder. It is then advanced across the putty using firm back and forth strokes. By maintaining the opposing ends of the blade in contact with undamaged portions of the panel, the damaged surface area is conformed to the contours of the undamaged surface.

Curved panels are repaired in a similar manner by removing the blade from the slotted holder and bending it while shaping the putty.

BRIEF DESCRIPTION OF THE DRAWINGS

FIG. 1 is a plan view of a shaping tool according to the invention;

FIG. 2 is a perspective view of an end grip for attachment to the end of a cutting blade;

FIG. 3 is a sectional view taken along the plane of line 3—3 in FIG. 1, the blade being removed for illustrative purposes;

FIG. 4 is an enlarged cutaway sectional view taken along the plane of line 4—4 in FIG. 1, the blade being removed for purposes of illustration;

DETAILED DESCRIPTION OF THE INVENTION

A complete kit is provided for shaping virtually every panel of a motor vehicle regardless of size or shape. The kit includes the components shown in FIGS. 1 and 2. A plurality of cutting blade sizes, one of which is shown in FIG. 1, is also included. Cutting blade lengths of six, twelve, and twenty-four inches are adequate for most if not all repairs to a vehicle body.

Figure 5:
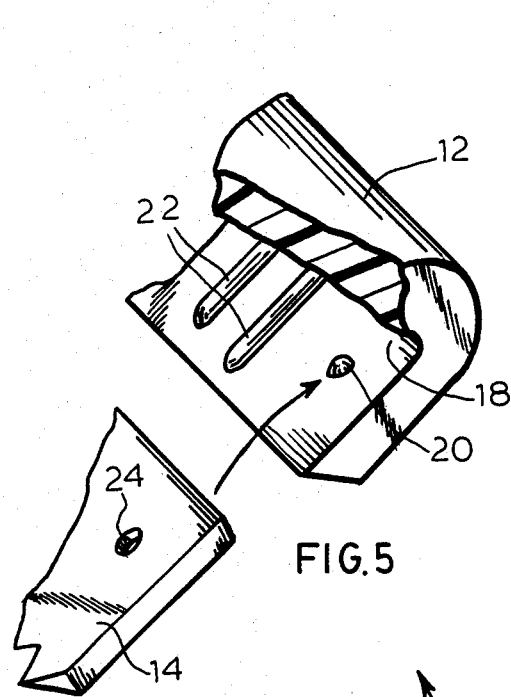
FIG. 5 is an exploded partially cutaway perspective view of an end of the shaping tool shown in FIG. 1.

The shaping tool 10 shown in FIG. 1 includes an elongate handle 12 and a cutting blade 14 having a flat body and a saw-toothed cutting edge 16. The handle is made from wood, plastic, or any other suitable material having sufficient rigidity for maintaining the blade 14 in a straight configuration during use. It includes a longitudinal slot 18 having a pair of dimples 20 at each end thereof. Friction grips 22 may also be provided. The dimples 20 snap within a pair of holes 24 in each end of the blade 14 as shown in FIG. 5.

A pair of cutter blade handle grips 26 are secured to the opposite ends 28 of the blade 14 when a curved panel is to be shaped. They are made from a resilient polymeric material to allow them to slide over the blade ends firmly yet easily. Each blade end is preferably devoid of teeth and fits snugly within the respective slots 30 within each grip. Indentations 32 are provided for the fingers.

The cutter blade may be a hacksaw blade cut to the desired length. It must be wide enough to fit within the handle slot 18 with the cutting edge 16 projecting therefrom. It should also be sufficiently flexible to permit usage on curved as well as flat surfaces.

Figure 6:
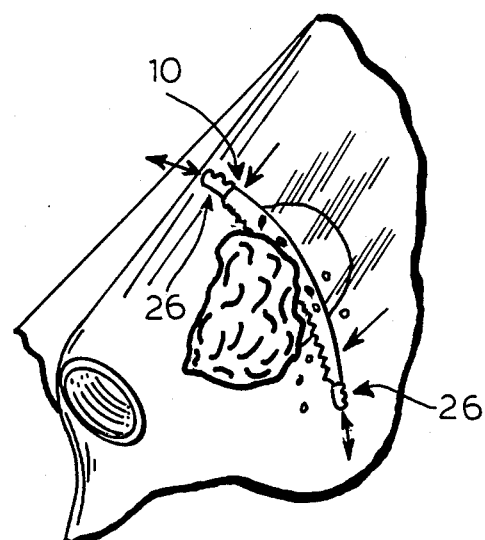
FIG. 6 is a perspective view of the shaping tool as employed in shaping a curved vehicle surface.

FIG. 6 illustrates the invention as employed for shaping a curved surface. Putty 34 is applied to a damaged area of a motor vehicle and allowed to harden partially. After securing the handle grips 26 to either end of the blade 14, the blade while bent to the desired contour of the panel is pressed into contact with the undamaged panel porions. Using back and forth strokes, it is advanced across the putty while maintaining contact with these undamaged portions. The contour of the curved panel is thereby imparted perfectly to the damaged portion as the excess putty is removed by the bowed blade.

Figure 7:
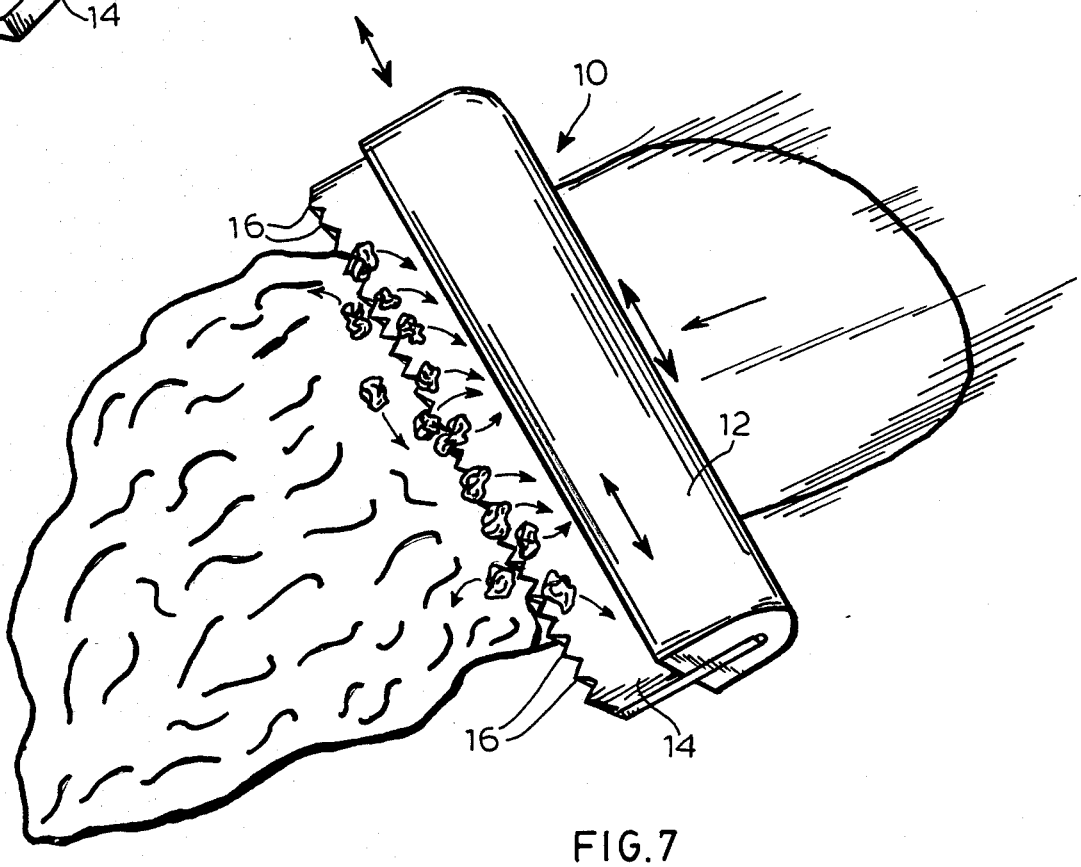
FIG. 7 is a perspective view of the shaping tool as employed in shaping a flat panel surface.

To repair flat panels, the cutting blade 14 is mounted within the slotted handle 12. Putty 34 is applied to the dmaged area and, as discussed above, allowed to harden partially. Using back and forth strokes while maintaining contact with undamaged areas, the blade is advanced across the putty and any excess is removed. The steps may be repeated to fill in any depressions or correct other irregularities. The area may then be sanded and readied for painting. FIG. 7 is illustrative of this method.

Although the putty should be shaped while only partially hardened, the method according to the invention may be practiced with fully hardened putty without excessive difficulty or risk of damage to the cutting edge. To remove material at a greater rate, the blade may be placed at a larger angle with respect to the panel surface.

When repairing damage to a panel having a natural body line therein, is blade is placed along the line so that the damaged area will have a line in perfect alignment therewith. Since blades of two feet or more in length could be employed, there should be no irregularities between repaired and undamaged portions. This is nearly impossible to accomplish quickly using state of the art techniques.

What is claimed is:

1. A method for shaping a curved motor vehicle panel comprising the steps of:
   applying body filler material to a damaged panel area;
   allowing said material to harden
   applying a cutting blade having a substantially flat flexible body and a saw-toothed cutting edge to said panel;
   bending the flat flexible body of said cutting blade into conformity with the shape of said panel; and
   cutting said filler material to shape by moving said cutting blade across said material while applying firm back and forth strokes.

2. A method as defined in claim 1 including the step of maintaining end portions of said cutting blade in contact with undamaged panel portions while applying said firm back and forth strokes.

3. A method as defined in claim 1 wherein said material is allowed to harden completely.

4. A method as defined in claim 1 including the step of cutting said filler material before it is completely hardened.

* * * * *